(12) United States Patent
Kawahara

(10) Patent No.: US 12,512,647 B2
(45) Date of Patent: Dec. 30, 2025

(54) SEMICONDUCTOR DEVICE

(71) Applicant: Mitsubishi Electric Corporation, Tokyo (JP)

(72) Inventor: Hiroyuki Kawahara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 933 days.

(21) Appl. No.: 17/627,174

(22) PCT Filed: Oct. 15, 2019

(86) PCT No.: PCT/JP2019/040508
§ 371 (c)(1),
(2) Date: Jan. 14, 2022

(87) PCT Pub. No.: WO2021/074971
PCT Pub. Date: Apr. 22, 2021

(65) Prior Publication Data
US 2022/0271509 A1    Aug. 25, 2022

(51) Int. Cl.
*H01S 5/32* (2006.01)
*H01S 5/042* (2006.01)
(Continued)

(52) U.S. Cl.
CPC ........ *H01S 5/3219* (2013.01); *H01S 5/04256* (2019.08); *H01S 5/227* (2013.01); *H01S 5/32308* (2013.01); *H01S 2304/04* (2013.01)

(58) Field of Classification Search
CPC .. H01S 5/32308; H01S 5/3219; H01S 5/3072; H01S 5/04256; H01S 5/227;
(Continued)

(56) References Cited

U.S. PATENT DOCUMENTS 5,495,493 A * 2/1996 Kurihara ............... H01S 5/2231
372/33
6,233,266 B1 * 5/2001 Kawasumi ............ H01S 5/305
257/14
(Continued)

FOREIGN PATENT DOCUMENTS

JP    S58-196088 A    11/1983
JP    S58-196089 A    11/1983
(Continued)

OTHER PUBLICATIONS

International Search Report issued in PCT/JP2019/040508 mailed Dec. 24, 2019.
(Continued)

*Primary Examiner* — Yuanda Zhang
(74) *Attorney, Agent, or Firm* — Studebaker Brackett PLLC

(57) ABSTRACT

A semiconductor device according to the present application includes a semiconductor substrate, an n-type first cladding layer provided on the semiconductor substrate, an n-type second cladding layer provided on the first cladding layer, an active layer provided on the second cladding layer, a p-type third cladding layer provided on the active layer, a surface electrode provided above the third cladding layer, a back surface electrode provided below the semiconductor substrate and a p-type diffusion prevention layer provided between the first cladding layer and the second cladding layer.

18 Claims, 5 Drawing Sheets

(51) Int. Cl.
*H01S 5/227* (2006.01)
*H01S 5/323* (2006.01)

(58) Field of Classification Search
CPC .. H01S 2304/04; H01S 5/3235; H01S 5/3211; H01S 5/2275; H01S 5/34313; H01S 5/32333; H01S 5/34373
USPC ...................................................... 372/38.05
See application file for complete search history.

(56) References Cited

U.S. PATENT DOCUMENTS

| | | | | |
|---|---|---|---|---|
| 2007/0009000 | A1* | 1/2007 | Tanaka | B82Y 20/00 372/45.01 |
| 2007/0086498 | A1 | 4/2007 | Ono et al. | |
| 2010/0248459 | A1* | 9/2010 | Makabe | H10D 30/015 438/681 |
| 2010/0316080 | A1* | 12/2010 | Yamaguchi | H01S 5/3434 372/46.01 |

FOREIGN PATENT DOCUMENTS

| | | | |
|---|---|---|---|
| JP | H03-151683 A | 6/1991 | |
| JP | H03-268376 A | 11/1991 | |
| JP | H05-145169 A | 6/1993 | |
| JP | H10-303507 A | 11/1998 | |
| JP | H11-177175 A | 7/1999 | |
| JP | 2006-253212 A | 9/2006 | |
| JP | 2007-109922 A | 4/2007 | |
| JP | 2019-071397 A | 5/2019 | |
| KR | 10-1995-0012840 A | 5/1995 | |
| WO | WO 02/071561 | * 9/2002 | ............... H01S 5/22 |

OTHER PUBLICATIONS

An Office Action mailed by the Korean Intellectual Property Office on Jul. 19, 2023, which corresponds to Korean Patent Application No. 10-2022-7010883 and is related to U.S. Appl. No. 17/627,174; with English language translation.

* cited by examiner

SEMICONDUCTOR DEVICE

FIELD

The present invention relates to a semiconductor device.

BACKGROUND

PTL 1 discloses a semiconductor laser. The semiconductor laser includes a p-type cladding layer, an n-type cladding layer, and an active layer provided between the p-type cladding layer and the n-type cladding layer. A first optical confinement layer formed of an i-type semiconductor is provided between the active layer and the p-type cladding layer. A second optical confinement layer formed of the i-type semiconductor is provided between the active layer and the n-type cladding layer. A diffusion prevention layer configured to prevent impurities from the p-type cladding layer from being diffused to the active layer is provided between the first optical confinement layer and the p-type cladding layer.

The diffusion prevention layer contains n-type impurities. Therefore, the diffusion of impurities Zn can be prevented from the p-type cladding layer from reaching the active layer. Accordingly, this makes it possible to reduce an absorption loss due to the diffusion of the impurities Zn from the p-type cladding layer.

CITATION LIST

Patent Literature

[PTL 1] JP 2006-253212 A

SUMMARY

Technical Problem

In the semiconductor laser, if impurities are incorporated into an electrode, the impurities may be diffused by current injection. When the diffused impurities form crystal defects in the vicinity of the active layer, light-emitting characteristics of the semiconductor laser may be degraded. A back surface electrode of the semiconductor laser may be formed on the entire surface of the semiconductor laser. In this case, the influence of the diffusion by impurities in the electrode may be particularly increased.

The present invention has been made to solve the above-described problems, and an object of the present invention is to provide a semiconductor device capable of preventing light-emitting characteristics from being degraded.

Solution to Problem

A semiconductor device according to the first invention of the present application includes a semiconductor substrate, an n-type first cladding layer provided on the semiconductor substrate, an n-type second cladding layer provided on the first cladding layer, an active layer provided on the second cladding layer, a p-type third cladding layer provided on the active layer, a surface electrode provided above the third cladding layer, a back surface electrode provided below the semiconductor substrate and a p-type diffusion prevention layer provided between the first cladding layer and the second cladding layer.

A semiconductor device according to the second invention of the present application includes a semiconductor substrate, a first cladding layer of a first conductivity type which is provided on the semiconductor substrate, a second cladding layer of the first conductivity type which is provided on the first cladding layer, an active layer provided on the second cladding layer, a third cladding layer of a second conductivity type which is provided on the active layer, a surface electrode provided above the third cladding layer, a back surface electrode provided below the semiconductor substrate and provided over a region larger than the surface electrode and a diffusion prevention layer of the second conductivity type which is provided between the first cladding layer and the second cladding layer.

A semiconductor device according to the third invention of the present application includes a semiconductor substrate, a first cladding layer of a first conductivity type which is provided on the semiconductor substrate, an active layer provided on the first cladding layer, a second cladding layer of a second conductivity type which is provided on the active layer, a surface electrode provided above the second cladding layer, a back surface electrode provided below the semiconductor substrate and a diffraction grating layer provided in one cladding layer of the first cladding layer and the second cladding layer and having a conductivity type different from that of the cladding layer.

A semiconductor device according to the fourth invention of the present application includes a semiconductor substrate, a first cladding layer of a first conductivity type which is provided on the semiconductor substrate, an active layer which is provided on the first cladding layer, and is of any one of the first conductivity type and a second conductivity type, a second cladding layer of the second conductivity type which is provided on the active layer, a surface electrode provided above the second cladding layer, a back surface electrode provided below the semiconductor substrate and an embedded layer which is provided on a side surface of the active layer and is of the same conductivity type as that of the active layer.

Advantageous Effects of Invention

In a semiconductor device according to first and second inventions of the present application, a diffusion prevention layer having a conductivity type different from that of a cladding layer is provided in the cladding layer. Therefore, the impurities can be trapped at a pn interface between the cladding layer and an active layer. Accordingly, the impurities can be prevented from reaching the active layer, whereby the light-emitting characteristic can be prevented from being degraded.

In a semiconductor device according to a third invention of the present application, a diffraction grating layer having a conductivity type different from that of a cladding layer is provided in the cladding layer. Therefore, the impurities can be trapped at a pn interface between the cladding layer and the diffraction grating layer. Accordingly, the impurities can be prevented from reaching the active layer, whereby the light-emitting characteristic can be prevented from being degraded.

In a semiconductor device according to a fourth invention of the present application, an embedded layer having the same conductivity type as that of an active layer is formed on a side surface of the active layer. Thus, no pn interface is formed in the active layer, whereby the impurities can be prevented from being accumulated in the active layer. Accordingly, the light-emitting characteristic can be prevented from being degraded.

DESCRIPTION OF EMBODIMENTS

Figure 1:
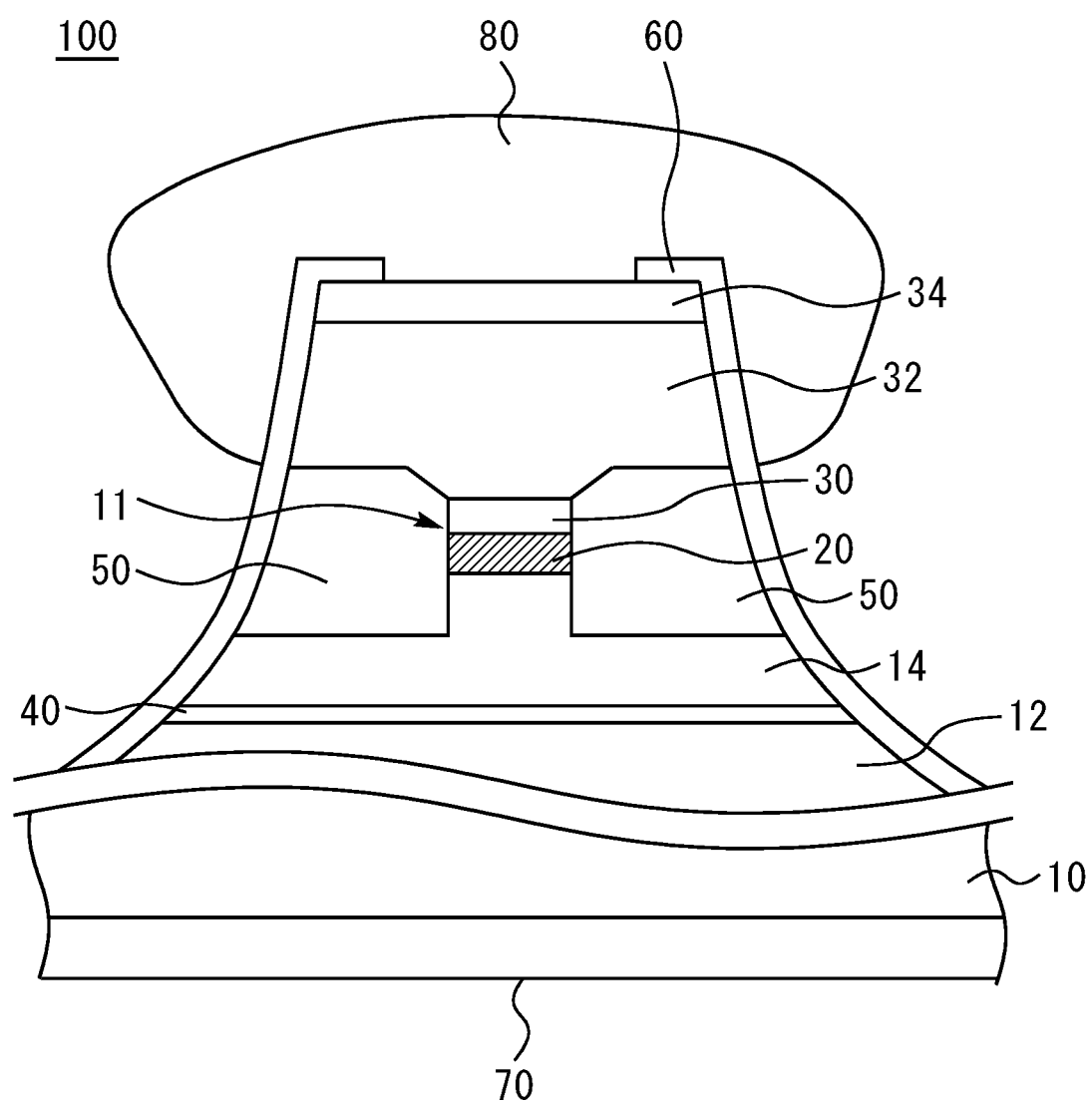
FIG. 1 is a cross-sectional view of a semiconductor device according to the first embodiment.

Semiconductor devices according to embodiments of the present invention are described with reference to drawings. Identical or corresponding constitutional elements are given the same reference numerals, and the repeated description of such constitutional elements may be omitted.

First Embodiment

FIG. 1 is a cross-sectional view of a semiconductor device 100 according to the first embodiment. The semiconductor device 100 is an optical semiconductor device such as a semiconductor laser. The semiconductor device 100 is used for optical communication, for example. The semiconductor device 100 includes a semiconductor substrate 10. An n-type first cladding layer 12 is provided on the semiconductor substrate 10. An n-type second cladding layer 14 is provided on the first cladding layer 12. A p-type diffusion prevention layer 40 is provided between the first cladding layer 12 and the second cladding layer 14.

In the second cladding layer 14, a width in the upper side is narrower than that in the lower side. That is, the second cladding layer 14 has a mesa portion. An undoped active layer 20 is provided on the mesa portion of the second cladding layer 14. A p-type third cladding layer 30 is provided on the active layer 20. The mesa portion of the second cladding layer 14, the active layer 20, and the third cladding layer 30 form a laminated mesa 11. Each of the mesa portion of the second cladding layer 14, the active layer 20, and the third cladding layer 30 has a width narrower than that of the semiconductor substrate 10, the first cladding layer 12 or the diffusion prevention layer 40 in a cross sectional view in a direction perpendicular to a waveguide direction. The side surfaces of the mesa portion of the second cladding layer 14, the active layer 20, and the third cladding layer 30 are embedded in an embedded layer 50.

A p-type fourth cladding layer 32 is provided on the third cladding layer 30 and the embedded layer 50. A p-type contact layer 34 is provided on the fourth cladding layer 32.

The first cladding layer 12, the diffusion prevention layer 40, the second cladding layer 14, the embedded layer 50, the fourth cladding layer 32, and the contact layer 34 are carved to the semiconductor substrate 10. Thus, a mesa-type laser portion is formed on the semiconductor substrate 10. A part of an upper surface and a side surface of the laser portion are covered by an insulating film 60. In the insulating film 60, an opening is formed above the contact layer 34.

A surface electrode 80 is provided on the contact layer 34. The surface electrode 80 covers a part of a side surface and an upper surface of the insulating film 60. The surface electrode 80 contacts the contact layer 34 in the opening in the insulating film 60.

A back surface electrode 70 is provided below the semiconductor substrate 10. The back surface electrode 70 is provided on the entire back surface of the semiconductor substrate 10.

Next, a method of manufacturing the semiconductor device 100 will be described. Here, there is described an example of a semiconductor laser which includes an AlGaInAs active layer formed on an n-type InP substrate. Materials, film thicknesses, concentrations, widths, heights and the like which will be described below are one example.

The semiconductor substrate 10 is an n-type InP substrate. First, on a 100 plane of the semiconductor substrate 10, the first cladding layer 12, the diffusion prevention layer 40, the second cladding layer 14, the active layer 20, and the third cladding layer 30 are grown in this order. A metal organic chemical vapor deposition (MOCVD) method is used for growth.

The first cladding layer 12 is formed of n-type InP. The film thickness of the first cladding layer 12 is 0.5 μm, and the doping concentration thereof is $1.0 \times 10^{18}$ cm$^{-3}$. The diffusion prevention layer 40 is formed of p-type InP. The film thickness of the diffusion prevention layer 40 is 0.05 μm, and the doping concentration thereof is $1.0 \times 10^{18}$ cm$^{-3}$. The second cladding layer 14 is formed of n-type InP. The film thickness of the second cladding layer 14 is 1.5 μm, and the doping concentration thereof is $1.0 \times 10^{18}$ cm$^{-3}$. The active layer 20 is formed of undoped AlGaInAs. The film thickness of the active layer 20 is 0.3 μm. The third cladding layer 30 is formed of p-type InP. The film thickness of the third cladding layer 30 is 0.3 μm, and the doping concentration thereof is $1.0 \times 10^{18}$ cm$^{-3}$.

Next, a stripe-shaped SiO$_2$ mask extending in a <011> direction is formed on the third cladding layer 30. The width of the SiO$_2$ mask is 1.5 μm. The SiO$_2$ mask is formed by a photolithography technique. Next, a stripe-shaped laminated mesa 11 is formed by performing dry etching using the SiO$_2$ mask. The height of the laminated mesa 11 is 2.0 μm.

Thereafter, a first embedded layer, a second embedded layer, and a third embedded layer are grown in order on each side of the laminated mesa 11 by the MOCVD method. The first embedded layer is formed of p-type InP. The film thickness of the first embedded layer is 0.5 μm, and the doping concentration thereof is $1.0 \times 10^{18}$ cm$^{-3}$. The second embedded layer is formed of n-type InP. The film thickness of the second embedded layer is 1.2 μm, and the doping concentration thereof is $5.0 \times 10^{18}$ cm$^{-3}$. The third embedded layer is formed of p-type InP. The film thickness of the third embedded layer is 0.3 μm, and the doping concentration thereof is $1.0 \times 10^{18}$ cm$^{-3}$. The first embedded layer, the second embedded layer, and the third embedded layer form an embedded layer 50. The embedded layer 50 has a pnp structure, and acts as a current blocking layer.

Next, the SiO$_2$ mask is removed by hydrofluoric acid. Thereafter, the fourth cladding layer 32, and the contact layer 34 are grown in this order on the third cladding layer 30 and the embedded layer 50 by the MOCVD method. The fourth cladding layer 32 is formed of p-type InP. The film thickness of the fourth cladding layer 32 is 2.0 μm, and the doping concentration thereof is $1.0 \times 10^{18}$ cm$^{-3}$. The contact layer 34 is formed of p-type InP. The film thickness of the contact layer 34 is 0.3 μm, and the doping concentration thereof is $1.0 \times 10^{19}$ cm$^{-3}$.

Thereafter, a stripe-shaped SiO$_2$ mask is formed in a region including an active layer stripe. That is, the SiO$_2$ mask is provided to overlap with the laminated mesa 11 in plan view. The width of the SiO$_2$ mask is 5 μm. The SiO$_2$ mask is formed by a photolithography. Next, an epitaxial structure is etched by HBr using SiO$_2$ mask to reach the semiconductor substrate 10. This makes it possible to remove a portion not covered by the SiO$_2$ mask in the epitaxial structure. Thus, the mesa-type laser portion is formed.

Next, the insulating film 60 is formed on the entire surface of the mesa-type laser portion. The insulating film 60 is formed of SiO$_2$, for example. Next, a portion having a width of 3 μm including the active layer stripe in the insulating film 60 is opened by dry etching. That is, an opening is formed in a portion right above the laminated mesa 11 in the insulating film 60.

Next, the surface electrode 80 is formed by vapor deposition on the contact layer 34 and the insulating film 60. The surface electrode 80 is formed of Au. Additionally, the back surface electrode 70 is formed by vapor deposition on the back surface of the semiconductor substrate 10. The back surface electrode 70 is formed of Au, for example. Thus, the structure of the semiconductor device 100 is completed.

The optical semiconductor device generally generates the light having a wavelength corresponding to the band gap energy of the active layer by injecting the current to the active layer. As the structure of the optical semiconductor device, a structure is often adopted in which the p-type cladding layer and the n-type cladding layer are provided above and below the active layer to interpose the active layer therebetween, and an ohmic electrode is formed on each cladding layer.

In the semiconductor laser, the impurities may be unintentionally incorporated into the electrode. At this time, the impurities diffused by the current injection may form crystal defects in the vicinity of the active layer. In this case, the light-emitting characteristics of the semiconductor laser may be degraded.

In contrast, the measures may be taken by forming barrier metals between an Au electrode and a semiconductor layer. The barrier metals are formed of Pt, W or the like.

However, the barrier metals may cause increase in resistance. If the impurities are incorporated into the barrier metals themselves, the impurities may be diffused to the vicinity of the active layer when the energization is performed in a conventional manner.

To achieve the high-speed operation, the surface electrode is often processed so that an electrode area is reduced. In contrast, the back surface electrode is often generally formed on the entire back surface of the semiconductor substrate. Therefore, it is conceivable that the influence by the impurities in the back surface electrode may be particularly increased.

As a comparative example of the present embodiment, a structure is assumed in which no p-type diffusion prevention layer exists in the n-type cladding layer provided between the semiconductor substrate and the active layer. In this structure, ionized impurities contained in the back surface electrode having a large area may be diffused by an electron current, and may be accumulated in the pn interface in the vicinity of the active layer. When the energization is further continued, the recombination current increases in a space charge region in the vicinity of the impurities accumulated in the pn interface. Therefore, the minority carrier lifetime decreases in a light-emitting region, whereby the light emission efficiency of the semiconductor laser may be reduced.

In contrast, in the present embodiment, the p-type diffusion prevention layer 40 exists between the first cladding layer 12 and the second cladding layer 14. This makes it possible to trap the ionized impurities at the pn interface formed by the n-type cladding layer and the p-type diffusion prevention layer 40. Therefore, the impurities can be prevented from reaching the active layer 20. Accordingly, the impurities can be prevented from being accumulated in the vicinity of the active layer 20. Even when the ionized impurities exist generally in the InP cladding layer, this does not affect the light emission of the active layer. Accordingly, the light emission efficiency can be prevented from being reduced.

In the present embodiment, an example of an embedded type laser has been described. The present embodiment is not limited thereto, and the same effect can be expected even by the other structures of a ridge type laser and the like. In the case where the present embodiment is applied to the embedded type laser, the same effect can be expected even when the p-type diffusion prevention layer 40 exists in the laminated mesa 11.

In the present embodiment, the back surface electrode 70 is provided on the entire back surface of the semiconductor substrate 10. The present embodiment is not limited thereto, and it is only required that the back surface electrode 70 is provided over a region larger than the surface electrode 80. Alternatively, a contact area between the back surface electrode 70 and the semiconductor substrate 10 may be larger than the contact area between the surface electrode 80 and the contact layer 34.

The conductivity type of each layer is not limited to the example mentioned in the present embodiment. That is, it is only required that each of the first cladding layer 12 and the second cladding layer 14 is a first conductivity type of one of n-type and p-type, and each of the diffusion prevention layer 40 and the third cladding layer 30 is a second conductivity type of the other of n-type and p-type.

The active layer 20 is not limited to AlGaInAs, and may be formed of InGaAsP.

The diffusion prevention layer 40 may be formed of a material such as AlInAs having a large barrier of the valence band. This makes it possible to further improve the trap effect of the impurities. The diffusion prevention layer 40 may contain Ga or Al.

The carrier concentration of each of the semiconductor substrate 10, the first cladding layer 12, the second cladding layer 14, and the diffusion prevention layer 40 may be $1 \times 10^{17}$ cm$^{-3}$ or more and $1 \times 10^{19}$ cm$^{-3}$ or less. Such a range makes it possible to control the p and n doping concentrations to the InP system.

The film thickness of the diffusion prevention layer 40 is preferably 100 nm or less. This is because when the p and n doping concentrations to the InP system is $1 \times 10^{17}$ cm$^{-3}$, the thickness of the depletion layer becomes about 100 nm. The film thickness of the diffusion prevention layer 40 is preferably 2 nm or more. Such a range makes it possible to generally control the film thickness.

A layer containing oxygen may be provided instead of the diffusion prevention layer 40. In this case, the impurities from the electrode are bound with oxygen and stay there. Therefore, the impurities can be prevented from reaching the active layer 20.

In the present embodiment, the diffusion prevention layer 40 is provided in the cladding layer below the active layer 20. The present embodiment is not limited thereto, and the diffusion prevention layer 40 may be provided in the cladding layer above the active layer 20. In this case, the diffusion prevention layer 40 is an n-type layer. This makes it possible to trap the ionized impurities at the pn interface formed by the p-type cladding layer and the n-type diffusion prevention layer 40. Accordingly, the impurities from the surface electrode 80 can be prevented from reaching the active layer 20.

Figure 2:
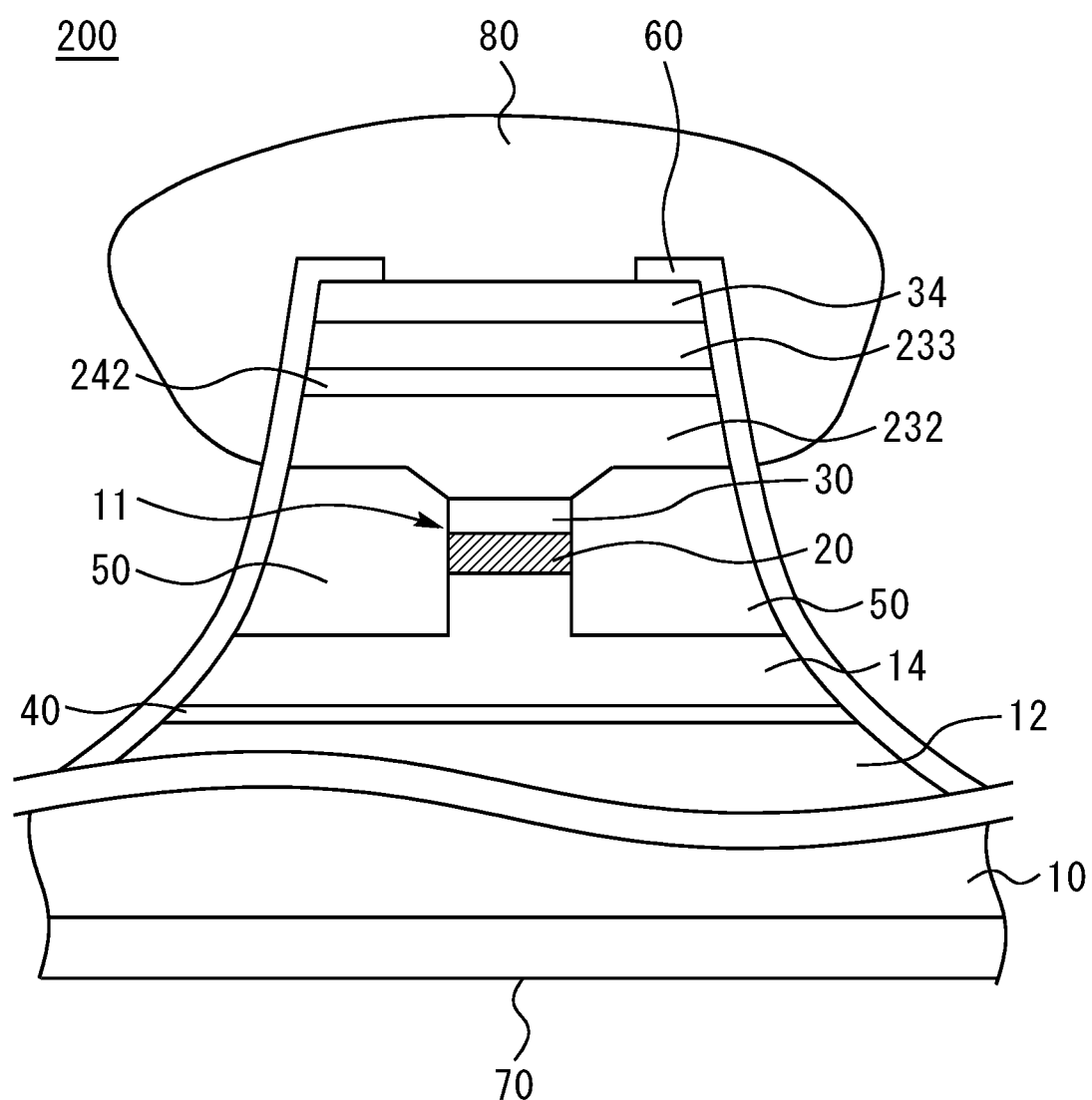
FIG. 2 is a cross-sectional view of a semiconductor device according to a modification example of the first embodiment.

FIG. 2 is a cross-sectional view of a semiconductor device 200 according to a modification example of the first embodiment. In the semiconductor device 200, a p-type fourth cladding layer 232 is provided on the third cladding layer 30 and the embedded layer 50. An n-type diffusion prevention layer 242 is provided on the fourth cladding layer 232. A p-type fifth cladding layer 233 is provided on the diffusion prevention layer 242. The other structure is the same as that of the semiconductor device 100.

In this way, the diffusion prevention layers 40 and 242 may be provided below and above the active layer 20, respectively. This makes it possible to trap the diffusion of the impurities from the surface electrode 80 and the back surface electrode 70 at the diffusion prevention layers 40 and 242.

These modifications can be applied, as appropriate, to semiconductor devices according to the following embodiments. Note that the semiconductor devices according to the following embodiments are similar to the semiconductor device of the first embodiment in many respects, and thus differences between the semiconductor devices according to the following embodiments and the semiconductor device of the first embodiment will be mainly described below.

Second Embodiment

Figure 3:
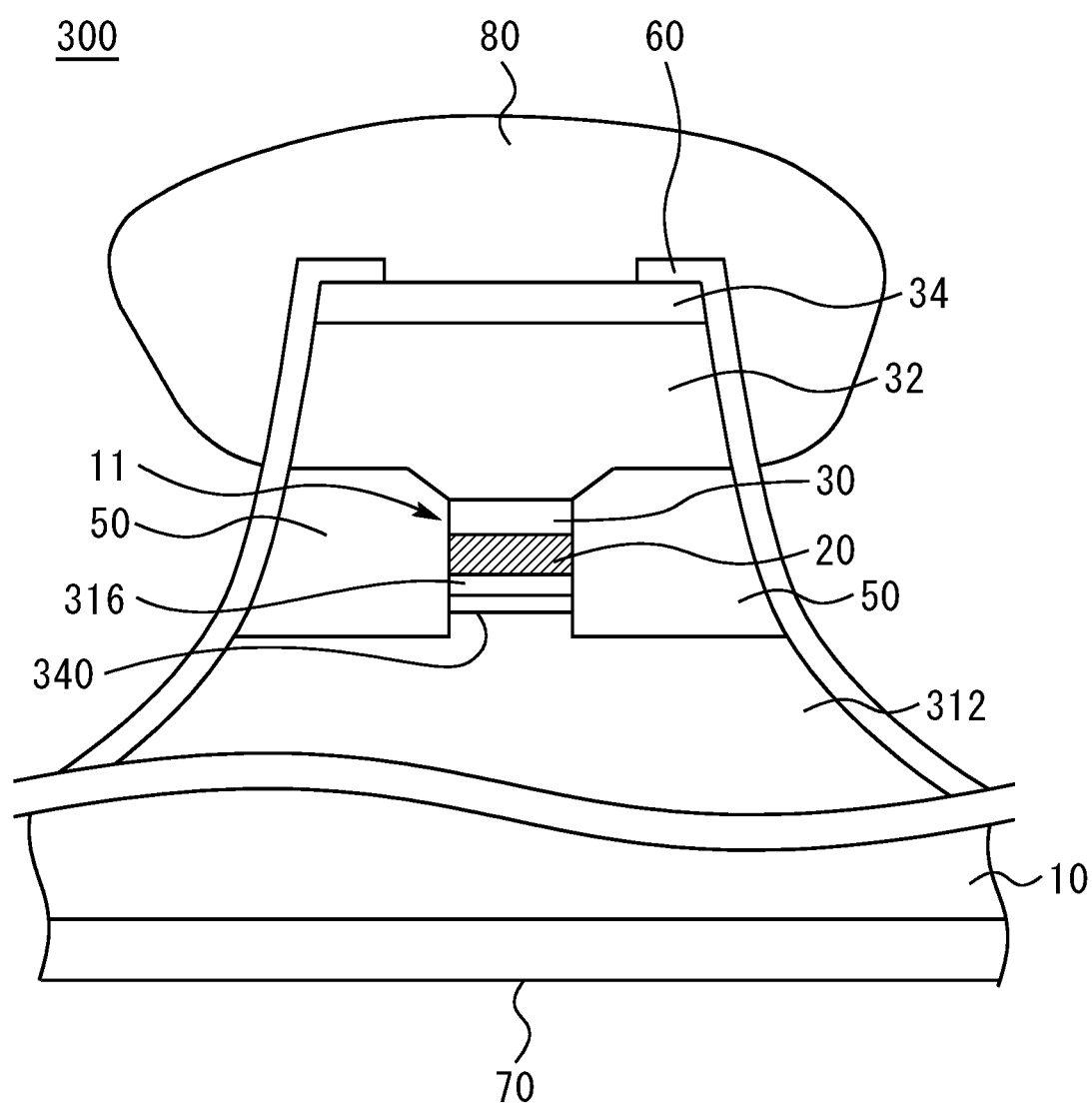
FIG. 3 is a cross-sectional view of a semiconductor device according to the second embodiment.
Figure 4:
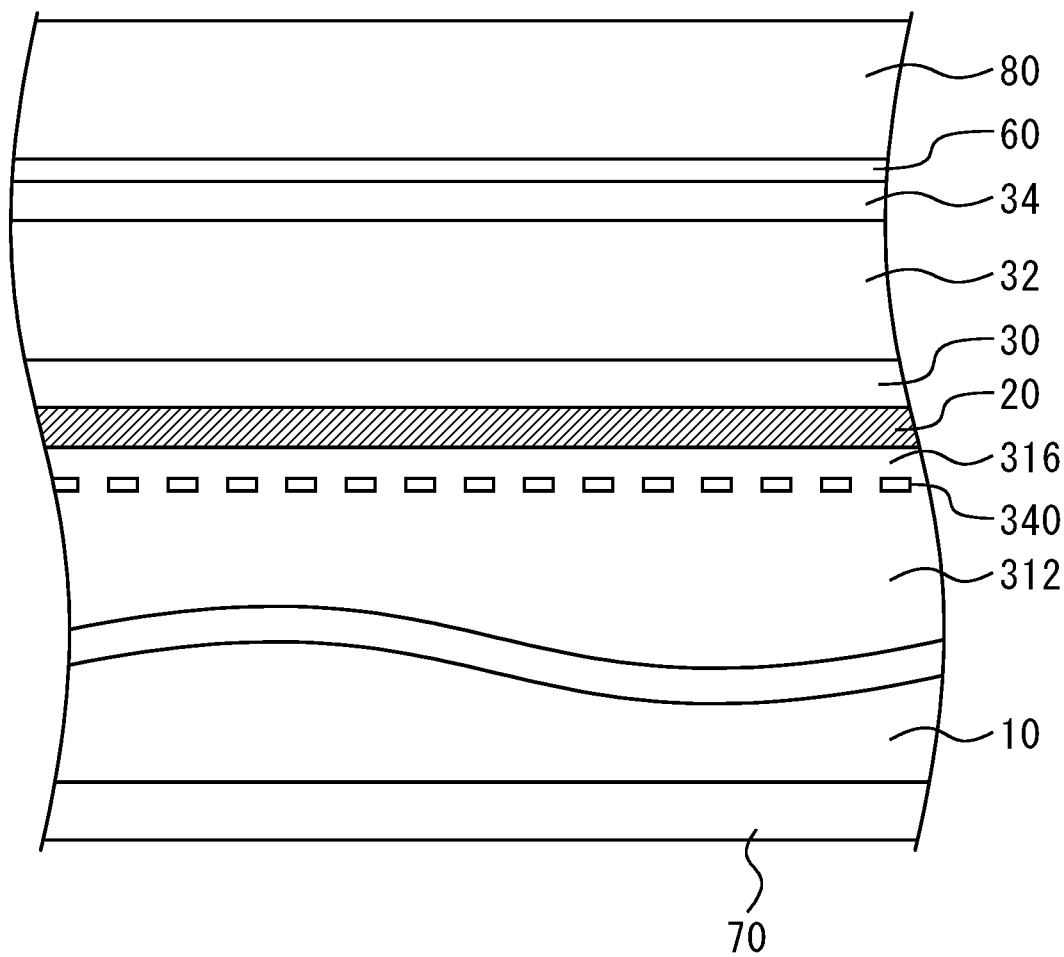
FIG. 4 is an enlarged view of FIG. 3.

FIG. 3 is a cross-sectional view of a semiconductor device 300 according to the second embodiment. FIG. 4 is an enlarged view of FIG. 3. FIGS. 3 and 4 each illustrate an example of a cross section perpendicular to a waveguide direction of the semiconductor device 300. The semiconductor device 300 is different from the semiconductor device of the first embodiment in that a diffraction grating layer 340 is provided instead of the diffusion prevention layer 40.

In the semiconductor device 300, an n-type first cladding layer 312 is provided on a semiconductor substrate 10. In the first cladding layer 312, a width in the upper side is narrower than that in the lower side. That is, the first cladding layer 312 has a mesa portion. The p-type diffraction grating layer 340 is provided on the mesa portion of the first cladding layer 312. The n-type second cladding layer 316 is provided on the diffraction grating layer 340.

An undoped active layer 20 is provided on the second cladding layer 316. A p-type third cladding layer 30 is provided on the active layer 20. The mesa portion of the first cladding layer 312, the diffraction grating layer 340, the second cladding layer 316, the active layer 20, and the third cladding layer 30 form a laminated mesa 11. Each of the mesa portion of the first cladding layer 312, the diffraction grating layer 340, the second cladding layer 316, the active layer 20, and the third cladding layer 30 has a width narrower than that of the semiconductor substrate 10 in a cross sectional view. The side surfaces of the mesa portion of the first cladding layer 312, the diffraction grating layer 340, the second cladding layer 316, the active layer 20, and the third cladding layer 30 are embedded in an embedded layer 50. The other structure is the same as that of the semiconductor device 100.

Next, a method of manufacturing the semiconductor device 300 will be described. Here, there is described an example of a distributed feedback (DFB) laser which includes an AlGaInAs active layer formed on an n-type InP substrate. First, on a 100 plane of the semiconductor substrate 10, the first cladding layer 312, the diffraction grating layer 340, and the second cladding layer 316 are formed. These layers are formed by the MOCVD method, for example.

The first cladding layer 312 is formed of n-type InP. The film thickness of the first cladding layer 312 is 0.5 μm, and the doping concentration thereof is $1.0\times10^{18}$ cm$^{-3}$. The diffraction grating layer 340 is formed of a p-type InGaAsP. The film thickness of the diffraction grating layer 340 is 0.05 μm, and the doping concentration thereof is $1.0\times10^{18}$ cm$^{-3}$. The second cladding layer 316 is formed of an n-type InP. The film thickness of the second cladding layer 316 is 0.05 μm, and the doping concentration thereof is $1.0\times10^{18}$ cm$^{-3}$.

Next, an SiO$_2$ mask is formed on the entire surface of the second cladding layer 316 by the chemical vapor deposition (CVD) method. Next, a plurality of openings are formed in the SiO$_2$ mask with a constant pitch. The openings are formed by a photolithography technique. The openings are formed with a pitch of 0.24 μm in a <011> direction. The length of the opening is 0.12 μm and the width thereof is 10 μm.

Next, a diffraction grating is formed in an epitaxial layer below the SiO$_2$ mask by the dry etching. Next, the SiO$_2$ mask is removed by hydrofluoric acid. Next, the exposed diffraction grating is filled up with the n-type InP layer.

The filling up is performed by the MOCVD method. The film thickness of the n-type InP layer is 0.2 μm, and the doping concentration thereof is $1.0\times10^{18}$ cm$^{-3}$.

Subsequently, the active layer 20 and the third cladding layer 30 are grown in order. The active layer 20 is formed of undoped AlGaInAs. The film thickness of the active layer 20 is 0.3 μm. The third cladding layer 30 is formed of p-type InP. The film thickness of the third cladding layer 30 is 0.3 μm, and the doping concentration thereof is $1.0\times10^{18}$ cm$^{-3}$.

In the above-described manufacturing method, the diffraction grating having p-type and n-type periodic structures in the waveguide direction can be formed. A p-type layer of the diffraction grating is the diffraction grating layer 340, and an n-type layer is an InP layer with which a space between the diffraction grating layers 340 is filled up. The subsequent manufacturing method is the same as that of the first embodiment.

In the present embodiment, the p-type diffraction grating layer 340 is provided in the n-type cladding layer. Thus, pn interfaces are periodically formed between the back surface electrode 70 and the active layer 20. This makes it possible to trap the ionized impurities from the back surface electrode 70 at the pn interfaces in the diffraction grating layer 340. Accordingly, the impurities can be prevented from reaching the active layer 20. Such an effect can prevent the impurities from being accumulated in the vicinity of the active layer 20, whereby the light emission efficiency of the semiconductor device 300 can be prevented from being reduced.

The diffraction grating layer 340 of the present embodiment has both of a diffraction grating function and an impurity trap function. Therefore, the light emission efficiency can be efficiently prevented from being reduced.

In the present embodiment, the diffraction grating layer 340 is provided in the cladding layer below the active layer 20. The present embodiment is not limited thereto, and the diffraction grating layer 340 may be provided in the cladding layer above the active layer 20. In this case, the ionized impurities from the surface electrode 80 can be trapped at the pn interfaces in the diffraction grating layer 340. Accordingly, the light emission efficiency of the semiconductor device 300 can be prevented from being reduced. Thus, it is only required that the diffraction grating layer 340 is provided in one of the cladding layer below the active layer 20 and the cladding layer above the active layer 20. It is only required that the diffraction grating layer 340 has a conductivity type different from that of the cladding layer in which the diffraction grating layer 340 is provided.

The conductivity type of each layer is not limited to the example mentioned in the present embodiment. That is, it is only required that each of the first cladding layer 312 and the second cladding layer 316 is a first conductivity type of one of n-type and p-type, and each of the diffraction grating layer 340 and the third cladding layer 30 is a second conductivity type of the other of n-type and p-type.

The active layer 20 may be formed of InGaAsP. The diffraction grating layer 340 may contain Ga or Al. As the barrier of the conductor or the valence band becomes large, the trap effect of impurities can be made larger. Therefore, the impurities can be efficiently trapped by selecting, as the material of the diffraction grating layer 340, Ga or Al which can lattice match the InP and easily form the barrier.

Third Embodiment

Figure 5:
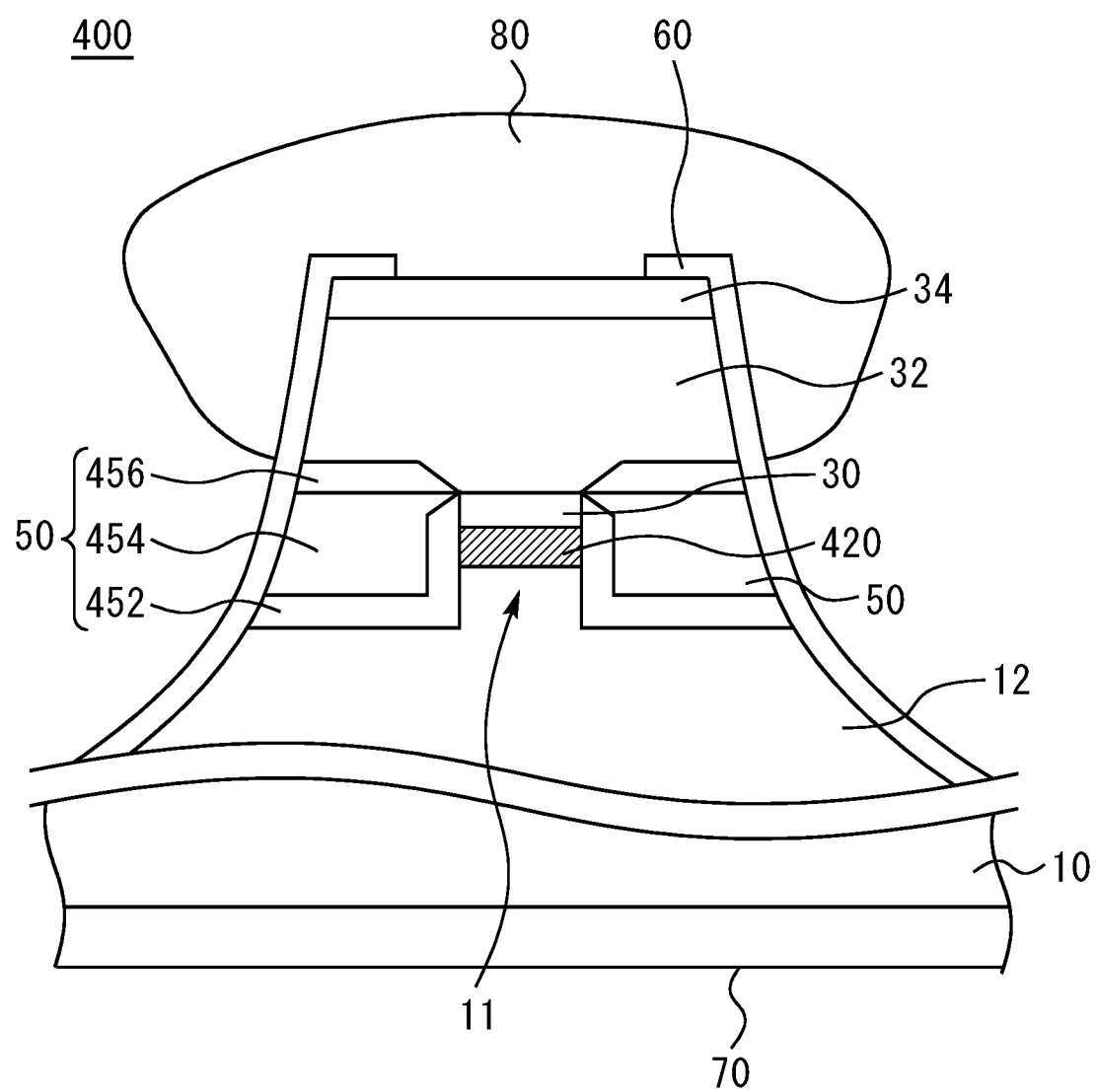
FIG. 5 is a cross-sectional view of a semiconductor device according to the third embodiment.

FIG. 5 is a cross-sectional view of a semiconductor device 400 according to the third embodiment. The present embodiment is characterized in that an active layer 420 is doped.

In the semiconductor device 400, an n-type first cladding layer 12 is provided on a semiconductor substrate 10. In the first cladding layer 12, a width in the upper side is narrower than that in the lower side. That is, the first cladding layer 12 has a mesa portion. The p-type active layer 420 is provided on the mesa portion of the first cladding layer 12. A p-type third cladding layer 30 is provided on the active layer 420. The mesa portion of the first cladding layer 12, the active layer 420, and the third cladding layer 30 form a laminated mesa 11. Each of the mesa portion of the first cladding layer 12, the active layer 420, and the third cladding layer 30 has a width narrower than that of the semiconductor substrate 10 in a cross sectional view. The other structure is the same as that of the first embodiment.

Next, a structure of an embedded layer 50 will be described. A p-type first embedded layer 452 is provided along a side surface of the laminated mesa 11 and an upper surface of the first cladding layer 12. The side surfaces of the mesa portion of the first cladding layer 12, the active layer 420 and third cladding layer 30 are covered by the first embedded layer 452. Therefore, the first embedded layer 452 having the same conductivity type as that of the active layer 420 is provided on the side surface of the p-type active layer 420.

An n-type second embedded layer 454 is provided on the first embedded layer 452. The second embedded layer 454 is provided to the same height as that of the upper surface of the laminated mesa 11. A p-type third embedded layer 456 is provided on the second embedded layer 454. The first embedded layer 452, the second embedded layer 454, and the third embedded layer 456 form the embedded layer 50. Note that the structure of the embedded layer 50 also applies to the first and second embodiments.

Next, a method of manufacturing the semiconductor device 400 will be described. Here, there is described an example of a semiconductor laser which includes an AlGaInAs active layer on an n-type InP substrate. First, on a 100 plane of the semiconductor substrate 10, the first cladding layer 12, the active layer 420, and the third cladding layer 30 are grown in this order. The first cladding layer 12 is formed of n-type InP. The film thickness of the first cladding layer 12 is 1.0 μm, and the doping concentration thereof is $1.0 \times 10^{18}$ cm$^{-3}$. The active layer 420 is formed of p-type AlGaInAs. The film thickness of the active layer 420 is 0.3 μm, and the doping concentration thereof is $1.0 \times 10^{18}$ cm$^{-3}$. The third cladding layer 30 is formed of p-type InP. The film thickness of the third cladding layer 30 is 0.3 μm, and the doping concentration thereof is $1.0 \times 10^{18}$ cm$^{-3}$. The subsequent manufacturing method is the same as that of the first embodiment.

In the present embodiment, the active layer 420 is doped, and the active layer 420 and the first embedded layer 452 have the same conductivity type. At this time, no pn interface is formed in the active layer 420. Accordingly, the impurities can be prevented from being accumulated in the active layer 420. Accordingly, the light emission efficiency of the semiconductor device 400 can be prevented from being reduced.

As a modification example of the present embodiment, the conductivity type of each layer is not limited to the example mentioned in the present embodiment. In the present embodiment, an example has been described in which the active layer 420 and the first embedded layer 452 are of p-type, but the same effect can be expected even when both are of n-type. That is, the first cladding layer 12 is a first conductivity type of one of n-type and p-type, and the third cladding layer 30 is a second conductivity type of the other of n-type and p-type. The active layer 420 may be of any one of the first conductivity type and the second conductivity type. At this time, the first embedded layer 452 is of the same conductivity type as that of the active layer 420.

Note that the technical features described in the above embodiments may be combined as appropriate.

REFERENCE SIGNS LIST 10 semiconductor substrate, 11 laminated mesa, 12 first cladding layer, 14 second cladding layer, 20 active layer, 30 third cladding layer, 32 fourth cladding layer, 34 contact layer, 40 diffusion prevention layer, 50 embedded layer, 60 insulating film, 70 back surface electrode, 80 surface electrode, 100, 200 semiconductor device, 232 fourth cladding layer, 233 fifth cladding layer, 242 diffusion prevention layer, 300 semiconductor device, 312 first cladding layer, 316 second cladding layer, 340 diffraction grating layer, 400 semiconductor device, 420 active layer, 452 first embedded layer, 454 second embedded layer, 456 third embedded layer

The invention claimed is:
1. A semiconductor device, comprising:
a semiconductor substrate;
an n-type first cladding layer provided on the semiconductor substrate;
an n-type second cladding layer provided on the first cladding layer;
an active layer provided on the second cladding layer;
a p-type third cladding layer provided on the active layer;
a surface electrode provided above the third cladding layer;
a back surface electrode provided below the semiconductor substrate; and
a p-type diffusion prevention layer provided between the first cladding layer and the second cladding layer, wherein:
the active layer is in direct contact with the n-type second cladding layer; and
the p-type diffusion prevention layer is in direct contact with the n-type second cladding layer.

2. The semiconductor device according to claim 1, wherein the back surface electrode is provided over a region larger than the surface electrode.

3. The semiconductor device according to claim 1, wherein the third cladding layer has a width narrower than that of the semiconductor substrate.

4. The semiconductor device according to claim 1, wherein the back surface electrode is provided on an entire back surface of the semiconductor substrate.

5. The semiconductor device according to claim 1, wherein each of the semiconductor substrate, the first cladding layer, the second cladding layer, the third cladding layer, and the diffusion prevention layer is formed of InP, and the active layer is formed of InGaAsP or AlGaInAs.

6. The semiconductor device according to claim 1, wherein each of the semiconductor substrate, the first cladding layer, the second cladding layer, and the third cladding layer is formed of InP, the active layer is formed of InGaAsP or AlGaInAs, and the diffusion prevention layer contains Ga or Al.

7. The semiconductor device according to claim 1, wherein
a carrier concentration of each of the semiconductor substrate, the first cladding layer, and the second cladding layer is $1 \times 10^{17}$ cm$^{-3}$ or more and $1 \times 10^{19}$ cm$^{-3}$ or less,
a carrier concentration of the diffusion prevention layer is $10^{17}$ cm$^{-3}$ or more and $1 \times 10^{19}$ cm$^{-3}$ or less, and
a film thickness of the diffusion prevention layer is 2 nm or more and 100 nm or less.

8. The semiconductor device according to claim 1, further comprising:
an insulating film formed over side surfaces of the semiconductor device and partly over an upper surface of the semiconductor device.

9. A semiconductor device, comprising:
a semiconductor substrate;
a first cladding layer of a first conductivity type which is provided on the semiconductor substrate;
a second cladding layer of the first conductivity type which is provided on the first cladding layer;
an active layer provided on the second cladding layer;
a third cladding layer of a second conductivity type which is provided on the active layer;
a surface electrode provided above the third cladding layer;
a back surface electrode provided below the semiconductor substrate and provided over a region larger than the surface electrode; and
a diffusion prevention layer of the second conductivity type which is provided between the first cladding layer and the second cladding layer, wherein:
the active layer is in direct contact with the second cladding layer; and
the diffusion prevention layer is in direct contact with the second cladding layer.

10. The semiconductor device according to claim 9, wherein the third cladding layer has a width narrower than that of the semiconductor substrate.

11. The semiconductor device according to claim 9, wherein the back surface electrode is provided on an entire back surface of the semiconductor substrate.

12. The semiconductor device according to claim 9, wherein each of the semiconductor substrate, the first cladding layer, the second cladding layer, the third cladding layer, and the diffusion prevention layer is formed of InP, and the active layer is formed of InGaAsP or AlGaInAs.

13. The semiconductor device according to claim 9, wherein each of the semiconductor substrate, the first cladding layer, the second cladding layer, and the third cladding layer is formed of InP, the active layer is formed of InGaAsP or AlGaInAs, and the diffusion prevention layer contains Ga or Al.

14. The semiconductor device according to claim 9, wherein
a carrier concentration of each of the semiconductor substrate, the first cladding layer, and the second cladding layer is $1 \times 10^{17}$ cm$^{-3}$ or more and $1 \times 10^{19}$ cm$^{-3}$ or less,
a carrier concentration of the diffusion prevention layer is $10^{17}$ cm$^{-3}$ or more and $1 \times 10^{19}$ cm$^{-3}$ or less, and
a film thickness of the diffusion prevention layer is 2 nm or more and 100 nm or less.

15. A semiconductor device comprising:
a semiconductor substrate;
a first cladding layer of a first conductivity type which is provided on the semiconductor substrate;
a second cladding layer of the first conductivity type which is provided on the first cladding layer;
an active layer provided on the second cladding layer;
a third cladding layer of a second conductivity type which is provided on the active layer;
a surface electrode provided above the third cladding layer;
a back surface electrode provided below the semiconductor substrate and provided over a region larger than the surface electrode;
a diffusion prevention layer of the second conductivity type which is provided between the first cladding layer and the second cladding layer; and
a pn interface formed between the diffusion prevention layer and at least one of the first cladding layer and the second cladding layer.

16. A semiconductor device, comprising:
a semiconductor substrate;
a first cladding layer of a first conductivity type which is provided on the semiconductor substrate;
a second cladding layer of the first conductivity type which is provided on the first cladding layer;
a diffusion prevention layer of a second conductivity type which is provided between the first cladding layer and the second cladding layer;
an active layer of the first conductivity type or the second conductivity type provided on the second cladding layer;
a third cladding layer of the second conductivity type which is provided on the active layer; and
an embedded layer having a same conductivity type as that of the active layer is formed on a side surface of the active layer.

17. The semiconductor device according to claim 16, further comprising:
a pn interface formed between the diffusion prevention layer and at least one of the first cladding layer and the second cladding layer.

18. The semiconductor device according to claim 16, wherein:
the active layer is in direct contact with the second cladding layer; and
the diffusion prevention layer is in direct contact with the second cladding layer.

* * * * *